3,344,206
POLYBUTADIENE BLENDS OF IMPROVED COLD FLOW

James N. Short, Bartlesville, Okla., assignor to Phillips Petroleum Company, a corporation of Delaware
No Drawing. Continuation of application Ser. No. 187,918, Apr. 16, 1962. This application Apr. 13, 1966, Ser. No. 542,425
3 Claims. (Cl. 260—894)

This is a continuation of U.S. application Serial No. 187,918, filed April 16, 1962 and now abandoned.

This invention relates to rubber compositions. In one aspect, the invention relates to a method for eliminating or substantially reducing the tendency of a polybutadiene to cold flow. In another aspect, it relates to a novel composition containing a low inherent viscosity polybutadiene and a high inherent viscosity polymer.

In recent years a great deal of research work has been directed toward the production of improved rubbery polymers. One polymer which has received considerable attention is a low inherent viscosity polybutadiene which is prepared by polymerizing 1,3-butadiene with an organolithium catalyst. The physical properties of this polymer are of such a nature that the polymer is particularly suitable for the fabrication of automobile and truck tires and other articles for which conventional synthetic rubbers have heretofore been comparatively unsatisfactory. However, in the manufacture and processing of the low inherent viscosity polybutadienes, certain difficulties have been encountered. For example, in the packaging, shipping and storage of the polymer, a problem has arisen because of its tendency to cold flow when in the unvulcanized state. Thus, if cracks or punctures develop in the package used in storing the polymer, it will flow from the package with a resulting product loss or contamination and sticking together of stacked packages. Furthermore, when attempting to extrude the low inherent viscosity polybutadiene, which has been compounded according to conventional recipes, extrusion rates tend to be unsatisfactorily low and the edges of the extrudate are often rough. The polymer also has a tendency to be baggy and crumbly on the mill. The present invention provides rubber composition containing a low inherent viscosity polybutadiene in which these disadvantages are reduced or substantially eliminated.

It is an object of this invention to provide a method for reducing or substantially eliminating the tendency of a low inherent viscosity polybutadiene to cold flow.

Another object of the invention is to provide a novel composition which contains a low inherent viscosity polybutadiene and a high inherent viscosity polymer, the composition having a reduced tendency to cold flow and possessing good processing properties.

Other and further objects and advantages of the invention will become apparent to those skilled in the art upon consideration of the accompanying disclosure.

Broadly speaking, the present invention resides in a novel rubbery composition which comprises a low inherent viscosity polybutadiene and a high inherent viscosity polymer. More specifically, the composition of this invention comprises (1) a major amount of a polybutadiene having an inherent viscosity in the range of 0.75 to 3, from 35 to 48 percent of the polybutadiene being formed by cis 1,4-addition of 1,3-butadiene, and (2) a minor amount of a polymer of a conjugated diene having an inherent viscosity in the range of 6 to 20. In general, the composition of this invention is prepared by blending from 2 to 40 parts by weight of component (2) with from 98 to 60 parts by weight of component (1). The amounts are selected so as to provide a total of 100 parts. However, the amount of the high inherent viscosity polymer is preferably in the range of 5 to 30 percent of the total weight of components (1) and (2). While any polymer of a conjugated diene having an inherent viscosity in the range of 6 to 20 can be employed in the composition, it is preferred to utilize a high inherent viscosity polymer selected from the group consisting of polybutadiene, polyisoprene, random copolymers of butadiene and isoprene, block copolymers of butadiene and isoprene, random copolymers of butadiene or isoprene with other vinylidene-containing monomers and block copolymers of butadiene or isoprene with other vinylidene-containing monomers. It has now been discovered that a substantial reduction in the tendency of the low inherent viscosity polybutadiene to cold flow can be readily accomplished by incorporating therein a minor amount of a polymer of very high inherent viscosity. In one method for obtaining a homogenous composition, solutions of the polymers in a hydrocarbon solvent are blended and the products are recovered by conventional means, such as by steam stripping, coagulation in an alcohol, such as isopropyl alcohol, or the like. A convenient method for preparing the compositions is to blend the polymer solutions as they are recovered from the reactor. Another suitable method for preparing the composition is to blend the materials on a roll mill, in a Banbury mixer, or similar kneading device.

The low inherent viscosity polybutadiene contains from 35 to 48 percent cis 1,4-addition, from 45 to 55 trans 1,4-addition, and from 6 to 10 percent 1,2-addition. The polymer is prepared by polymerizing 1,3-butadiene with an organolithium compound. Organolithium compounds suitable for use in the polymerization have the formula $RLi_x$, wherein R is a hydrocarbon radical selected from the group consisting of aliphatic, cycloaliphatic and aromatic radicals and $x$ is an integer from 1 to 4, inclusive. The R in the formula has a valence equal to the integer and preferably contains from 1 to 20, inclusive, carbon atoms, although higher molecular weight compounds can be utilized. In preparing the low inherent viscosity polybutadiene, it is often preferred to use an alkyllithium compound, such as n-butyllithium, as the catalyst. Examples of other suitable organolithium compounds include methyllithium, isopropyllithium, tert-octyllithium, n-decyllithium, phenyllithium, naphthyllithium, 4-butylphenyllithium,
p-tolyllithium,
4-phenylbutyllithium,
cyclohexyllithium,
4-butylcyclohexyllithium,
4-cyclhexylbutyllithium,
dilithiomethane,
1,4-dilithiobutane,
1,10-dilithiodecane,
1,20-dilithioeicosane,
1,4-dilithiocyclohexane,
1,4-dilithio-2-butene,
1,8-dilithio-3-decene,
1,4-dilithiobenzene,
1,5-dilithionaphthalene,
1,2-dilithio-1,2-diphenylethane,
9,10-dilithio-9,10-dihydroanthracene,
1,2-dilithio-1,8-diphenyloctane,
1,3,5-trilithiopentane,
1,5,15-trilithioeicosane,
1,3,5-trilithiocyclohexane,
1,2,5-trilithionaphthalene,
1,3,5-trilithioanthracene,
1,3,5,8-tetralithiodecane,
1,5,10,20-tetralithioeicosane, 1,2,3,5-tetralithiocyclohexane,
1,2,3,5-tetralithio-4-hexylanthracene,
and the like.

The process used in preparing the low inherent viscosity polybutadiene can be conducted at a temperature in the range of −80 to 150° C., preferably at a temperature in the range of −20 to 80° C. The polymerization reaction can be carried out under autogenous pressures. It is usually desirable to operate at a pressure sufficient to maintain the reaction mixture in the liquid phase. The polymerization is carried out in the presence of a hydrocarbon diluent, such as propane, isobutane, n-pentane, isooctane, cyclohexane, ethylcyclopentane, methylcyclohexane, benzene, toluene, xylene, ethylbenzene, and the like. The actual pressure used in the process will thus depend upon the particular diluene employed and the temperature at which the polymer is to be conducted.

A polybutadiene having the desired inherent viscosity in the range of 0.75 to 3.0 can be readily prepared by varying the concentration of the organolithium compound. For example, with a completely dry system and no other impurities present to destroy the organolithium compound, about 7 millimoles of effective catalyst per 100 grams of monomer is generally required to give a polymer having an inherent viscosity of 0.75, and about 0.25 millimole of effective catalyst per 100 grams of monomer is generally required for the production of a polymer having an inherent viscosity of 3.0. It has been found that for practical operation approximately 0.3 m.h.m. or more of catalyst is needed as a scavenger for the system.

A large number of monomer combinations and catalyst systems can be used in preparing the high inherent viscosity polymer used in the composition of this invention. In general, any polymer of a conjugated diene having an inherent viscosity in the range of 6 to 20 can be employed in preparing the composition. A high inherent viscosity cis-polybutadiene containing at least 85 percent, e.g., from 85 to 98 percent and higher, cis 1,4-addition has been found to be particularly suitable for use in preparing the composition of this invention. Examples of other suitable polymers include emulsion polybutadiene, cis-polyisoprene, a random copolymer of butadiene and isoprene, a block copolymer of butadiene and isoprene, a random copolymer of butadiene and styrene, and a block copolymer of butadiene and styrene.

A suitable process for preparing a high inherent viscosity cis-polybutadiene comprises polymerizing 1,3-butadiene with a catalyst comprising (1) a trialkylaluminum, such as triethylaluminum or triisobutylaluminum, and (2) titanium tetraiodide, a mixture of titanium tetrachloride and titanium tetraiodide, or a titanuim bromide or chloride and iodine. The process used for preparing the cis-polybutadiene is generally conducted at a temperature in the range of −80 to 120° C. and at a pressure sufficient to maintain the reaction mixture substantially in the liquid phase. The polymerization is preferably carried out in the presence of a hydrocarbon diluent of the type which has been mentioned hereinbefore. The amount of the catalyst employed in preparing the cis-polybutadiene can vary over a rather wide range. The amount of the trialkylaluminum used is usually in the range of 1 to 20 mols per mol of the halogen-containing component, i.e., the titanium tetraiodide, the mixture of titanium halides, or the titanium halide and elemental iodine. However, a preferred mol ratio is from 2.5:1 to 12:1 of the organometal compound to the halogen-containing component. When using as the catalyst system a trialkylaluminum and more than one metal halide, i.e., titanium tetrachloride and titanium tetraiodide, the mol ratio of the tetrachloride to the tetraiodide is usually in the range of 0.05:1 to 5:1. With a catalyst system comprising a trialkylaluminum, a titanium chloride or bromide and elemental iodine, the mol ratio of titanium halide to iodine is generally in the range of 10:1 to 0.25:1, preferably 3:1 to 0.25:1. A cis-polybutadiene having a high inherent viscosity, i.e., in the range of 6 to 20, can be obtained by controlling the catalyst level employed in the polymerization. Thus, with the trialkylaluminum-titanium tetraiodide catalyst system, from 0.63 to 1.62 m.h.m. (millimols per 100 grams of monomer) of the trialkylaluminum and from 0.02 to 0.12 m.h.m. of the titanium tetraiodide are utilized. When utilizing the system containing a mixture of titanium halides, from 0.4 to 0.6 m.h.m. of the trialkylaluminum, from 0.005 to 0.05 m.h.m. of the titanium tetrachloride and from 0.005 to 0.05 m.h.m. of the titanium tetraiodide can be used. With a catalyst system containing elemental iodine, from 0.4 to 0.6 m.h.m. of the trialkylaluminum, 0.01 to 0.05 m.h.m. of the titanium tetrachloride and from 0.017 to 0.07 m.h.m. of the elemental iodine can be employed.

A high inherent viscosity cis-polybutadiene suitable for use in preparing the composition of this invention can also be prepared by polymerizing 1,3-butadiene with a catalyst comprising (1) an alkylaluminum dihalide and (2) a nickelous or cobaltous compound. It is often preferred to use as component (2) in the catalyst system the reaction product obtained by reacting a cobaltous compound or a nickelous compound with ammonia or an amine. Examples of specific catalyst systems which can be employed include (1) ethyl-aluminum dichloride and cobaltous chloride, (2) ethylaluminum dichloride, cobaltous chloride and pyridine, (3) ethylaluminum sesquichloride and cobaltous chloride, (4) ethylaluminum sesquichloride, cobaltous chloride and pyridine, and (5) ethylaluminum dichloride, cobaltous chloride and ammonia. The polymerization process utilizing this catalyst is usually conducted at a temperature in the range of −80 to 120° C. and at a pressure sufficient to maintain the reaction mixture in the liquid phase. The polymerization is also conducted in the presence of a hydrocarbon diluent, which can be of the type described hereinbefore. The mol ratio of aluminum to cobalt and nickel in the catalyst is in the range of 2:1 to 400:1. When using an amine-type compound in the catalyst system, the mol ratio of this material to cobalt or nickel is in the range of 0.25:1 to 8.5:1, preferably in the range of 0.5:1 to 8:1. A polybutadiene having an inherent viscosity in the desired range can be readily obtained by adjusting the catalyst level employed in the polymerization. For example, a polybutadiene having an inherent viscosity in the desired range is obtained by using a catalyst system containing 10 m.h.m. of ethylaluminum dichloride, 1.0 m.h.m. of cobaltous chloride and 1 m.h.m. of pyridine.

A polybutadiene having a high inherent viscosity can also be prepared by polymerizing 1,3-butadiene in the presence of an organolithium compound having the formula $RLi_x$ as defined hereinbefore. The polymerization process can be conducted under temperature and pressure conditions as previously discussed. A product having a high inherent viscosity is obtained by adjusting the catalyst level so that 0.1 m.h.m. or less of effective catalyst is present. It has been found that 0.3 m.h.m. of the organolithium compound is usually required to act as a scavenger for the system. A high inherent viscosity cis-polyisoprene can also be obtained by polymerizing isoprene with the same type of organolithium catalyst while using essentially the same polymerization conditions. As in the polymerization of 1,3-butadiene, 0.1 m.h.m. or less of effective catalyst is employed in preparing the polymer.

It is also within the scope of the present invention to employ a high inherent viscosity polybutadiene which has been prepared in an emulsion polymerization system. In preparing such a polymer, the polymerization is conducted at about −20° C., utilizing an iron pyrophosphate recipe which contains no modifier.

As mentioned hereinbefore, various types of random copolymers and block copolymers can also be employed in the practice of this invention. A particularly suitable block copolymer can be prepared by polymerizing a mixture of (1) 1,3-butadiene, isoprene or piperylene and (2)

a vinyl-substituted aromatic hydrocarbon with an organolithium compound having the formula RLi, wherein R is a hydrocarbon radical, in the presence of a hydrocarbon diluent. Examples of suitable vinyl-substituted aromatic hydrocarbons include styrene, divinylbenzene, 3-vinyltoluene, 3-methylstyrene and the like. Suitable hydrocarbon diluents include paraffinic, cycloparaffinic and aromatic hydrocarbons, specific examples of which have been given hereinbefore. The polymerization is conducted at a temperature in the range of −20 to 150° C. at a pressure sufficient to maintain the reactant materials substantially in the liquid phase. In another procedure for preparing suitable block copolymers utilizing an organolithium catalyst, a first monomer selected from the group consisting of 1,3-butadiene, 2-methyl-1,3-butadiene, 1,3-pentadiene, and vinyl-substituted aromatic hydrocarbons is initially contacted with the catalyst in the presence of a hydrocarbon diluent so as to form a polymeric block of the selected monomer. After polymerization of substantially all of the selected first monomer, a second monomer selected from the monomers of the aforementioned group and additionally including vinyl halides, vinylidene halides, acrylonitrile, alkyl esters of acrylic acid and alkyl esters of homologues of acrylic acid is contacted with the catalyst in the presence of the polymeric block initially formed and the hydrocarbon diluent. The first monomer selected is different from the second monomer, and at least one of the monomers is a conjugated diene. When preparing block copolymers having inherent viscosities in the range of 6 to 20, an effective catalyst level of 0.1 m.h.m. of the organolithium compound is used.

A random copolymer having a high inherent viscosity can also be prepared by utilizing an organolithium catalyst. According to this process, a random copolymer is prepared by contacting at least two members selected from the group consisting of 1,3-butadiene, isoprene, piperylene, vinyl-substituted aromatic hydrocarbons, vinyl halides, vinylidene halides, esters of acrylic acids and esters of homologues of acrylic acid with an organolithium compound in the presence of a solvent mixture comprising (1) paraffinic, cycloparaffinic or aromatic hydrocarbons, and (2) a polar organic compound, such as ethers, thioethers and tertiary amines. At least one of the two monomers selected from the foregoing group is a conjugated diene. The amount of ether employed in the solvent mixture generally comes within the range of 0.005 to 50 weight percent of the total mixture. A random copolymer having a high inherent viscosity can be obtained by utilizing an effective catalyst level of 0.1 m.h.m. of the organolithium compound. The details of the process for preparing random copolymers are disclosed in U.S. Patent No. 2,975,160, issued to R. P. Zelinski on March 14, 1961. This patent also discloses suitable examples of specific monomers of the types which can be utilized in the process for preparing block copolymers as well as the random copolymers.

A more comprehensive understanding of the invention can be obtained by referring to the following illustrative examples, which are not intended, however, to be unduly limitative of the invention.

*Example I*

A polybutadiene having an inherent viscosity of 1.76 was prepared by polymerizing 1,3-butadiene with n-butyllithium. A polybutadiene prepared with this catalyst and having an inherent viscosity of 1.76 has approximately the following microstructure: 43 percent cis 1,4-addition, 50 percent trans 1,4-addition, and 7 percent 1,2-addition. The microstructure of this polymer and the polymers referred to hereinafter may be determined by the method of Silas, Yates and Thornton, Anal. Chem., 31, No. 4, 529–532 (1959). A polybutadiene having an inherent viscosity of 7.4 was also prepared utilizing a similar catalyst system. The recipes employed in the runs are shown below.

RECIPES

| Butyllithium Polymers | I.V. 1.76[2] | I.V. 7.4[2] |
|---|---|---|
| 1,3-butadiene, parts by weight | 100 | 100 |
| Cyclohexane, parts by weight | 960 | 960 |
| n-Butyllithium, m.h.m.[1] | 0.8 | 0.6 |
| Temperature, °F | 122 | 122 |
| Time, hours | 6 | 16 |
| Conversion, percent | 100 | 100 |

[1] Millimols per 100 grams of monomer.
[2] One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.

The low and high inherent viscosity polymers were each precipitated from solution in the polymerization diluent by adding isopropyl alcohol. The precipitated polymers were then separated and dried in a vacuum oven. Proportions of each polymer, as shown in Table I below, were then weighed into vessels and cyclohexane was added to form solutions of about 10 weight percent. The mixtures were then agitated at 122° F. for from 16 to 18 hours. The blended polymers were recovered by pouring the mixtures into isopropyl alcohol, separating the precipitated polymer and drying same in a vacuum oven. Certain properties of the resulting blends are set forth hereinafter in Table I.

TABLE I

|  | A | B | C | D |
|---|---|---|---|---|
| 1.74 I.V. Polybutadiene, parts by weight | 100 | 90 | 80 | 70 |
| 7.4 I.V. Polybutadiene, parts by weight | 0 | 10 | 20 | 30 |
| Mooney (ML–4 at 212° F.)[1] | 16 | 24 | 35 | 50 |
| Cold flow, mg./min.[2] | 47.3 | 10.6 | 3.9 | 1.9 |

[1] ASTM D–297–55T.
[2] Determined by extruding the rubber through a ¼ inch orifice at 3.5 p.s.i. pressure and a temperature of 50° C. (122° F.). After allowing 10 minutes to reach steady state, the rate of extrusion was measured and the values reported in milligrams per minute.

The data in the foregoing table indicate that the tendency of the low inherent viscosity polybutadiene to cold flow was substantially reduced by blending the polymer with the high inherent viscosity polybutadiene.

*Example II*

A run was conducted in which a polybutadiene having an inherent viscosity of 1.90 was prepared by polymerizing 1,3-butadiene with n-butyllithium. The polymer obtained in this run was subsequently blended with a cis-polybutadiene having an inherent viscosity of 12.3. The cis-polybutadiene, which contained more than 95 percent cis 1,4-addition, was prepared by polymerizing 1,3-butadiene with a catalyst consisting of triisobutylaluminum, titanium tetrachloride and iodine. The recipes employed in the polymerizations are shown below.

RECIPES

|  | Butyllithium Polymer,[1] I.V. 1.90 | Cis-polybutadiene, I.V. 12.3 |
|---|---|---|
| 1,3-butadiene, parts by weight | 100 | 100 |
| Toluene, parts by weight | 1,100 | 1,200 |
| Triisobutylaluminum, m.h.m |  | 0.6 |
| Titanium tetrachloride, m.h.m |  | 0.3 |
| Iodine, m.h.m |  | 0.052 |
| n-Butyllithium, m.h.m | 1.17 |  |
| Temperature, °F | 122 | 41 |
| Time, hours | 2 | 1 |
| Conversion, percent | 89 | 26 |

[1] This polymer has approximately the following microstructure: 44 percent cis 1,4-addition, 49 percent trans 1,4-addition, and 7 percent 1,2-addition.

The low inherent viscosity polybutadiene and the high inherent viscosity cis-polybutadiene were retained in the diluents used in the polymerizations, and blends were prepared by mixing predetermined quantities of each of the solutions. The resulting mixtures were agitated at about 75° F. for from about 10 to 15 minutes. The blended polymers were recovered by pouring the mixtures into isopropyl alcohol, separating the precipitated polymer and drying same in a vacuum oven. Properties of the blends prepared are shown hereinafter in Table II.

TABLE II

|  | A | B | C |
|---|---|---|---|
| 1.90 I.V. Polybutadiene, parts by weight | 100 | 75 | 63.5 |
| 12.3 I.V. Polybutadiene, parts by weight | 0 | 25 | 37.5 |
| Mooney, (ML-4 at 212° F.) [1] | 28 | 29 | 40 |
| Cold flow, mg./min.[1] | 22.9 | 9.6 | 3.7 |

[1] See footnotes to Table I.

The data in Table II indicate that the tendency of the low inherent viscosity polybutadiene to cold flow was substantially reduced by blending the polymer with a high inherent viscosity cis-polybutadiene.

*Example III*

A polybutadiene having an inherent viscosity of 1.74 was prepared by polymerizing 1,3-butadiene with n-butyllithium. This polymer was subsequently blended with polymers of polybutadiene prepared with a cobalt-containing catalyst and having inherent viscosities of 6.8 and 6.9. The high inherent viscosity polybutadiene contained more than 95 percent cis 1,4-addition. The recipes employed in preparing the different polymers are shown below.

RECIPES

|  | Co Polymers | | BuLi Polymer,[1] I.V. 1.74 |
|---|---|---|---|
|  | I.V. 6.8 | I.V. 6.9 |  |
| 1,3-butadiene, parts by weight | 100 | 100 | 100 |
| Toluene, parts by weight | 1,100 | 1,100 | 1,100 |
| Ethylaluminum sesquichloride, m.h.m. | 10 | 10 | |
| CoCl₂, m.h.m. | 1 | 1 | |
| n-Butyllithium, m.h.m. | | | 1.20 |
| Temperature, °F | 41 | 41 | 122 |
| Time, hours | 72 | 72 | 5.25 |
| Conversion, percent | 25 | 27 | 100 |

[1] This polymer has approximately the following microstructure: 42 percent cis 1,4-addition, 51 percent trans 1,4-addition, and 7 percent 1,2-addition.

The polymers prepared as described above were solution blended, following the procedure described in Example II. Properties of the compositions obtained are shown below in Table III.

TABLE III

|  | A | B | C | D |
|---|---|---|---|---|
| 1.74 I.V. polybutadiene, parts by weight | 100 | 90 | 80 | 70 |
| 6.8 I.V. cis-polybutadiene, parts by weight | 0 | 10 | 20 | 0 |
| 6.9 I.V. cis-polybutadiene, parts by weight | 0 | 0 | 0 | 30 |
| Mooney (ML-4 at 212° F.) | 15 | 20 | 26 | 37 |
| Cold flow, mg./min. | 21.4 | 15.8 | 10.5 | 8.4 |

The data in Table III show that addition of the high inherent viscosity cis-polybutadiene to the low inherent viscosity polybutadiene resulted in a rubber composition having a reduced tendency to cold flow.

*Example IV*

A run was conducted in which a low inherent viscosity polybutadiene was blended with a polybutadiene containing more than 95 percent cis 1,4-addition. The polybutadiene having an inherent viscosity of about 1.9 was prepared according to the recipe shown below. A polybutadiene prepared with a butyllithium catalyst and having an inherent viscosity of 1.9 has the following microstructure: 44 percent cis 1,4-addition, 49 percent trans 1,4-addition, and 7 percent 1,2-addition.

RECIPE

| 1,3-butadiene | parts by weight | 100 |
|---|---|---|
| Toluene | parts by weight | 1000 |
| n-Butyllithium,[1] | m.h.m. | 1.15 |
| Temperature | °F | 122 |
| Time | hours | 19 |
| Conversion | percent | 100 |
| ML-4 at 212° F. | | 10 |

[1] In n-pentane solution.

The reaction was shortstopped with one part by weight of 2,2'-methylene-bis(4-methyl-6-tert-butylphenol) which was added as a 10 weight percent solution in an equal volume mixture of isopropyl alcohol and toluene.

The cis-polybutadiene having an inherent viscosity of 15.2 was prepared according to the recipe shown below.

RECIPE

| 1,3-butadiene | parts by weight | 100 |
|---|---|---|
| Toluene | parts by weight | 1050 |
| Triisobutylaluminum | m.h.m. | 0.7 |
| Iodine | m.h.m. | 0.07 |
| Titanium tetrachloride | m.h.m. | 0.04 |
| Temperature | °F | 41 |
| Time | hours | 1.2 |

The reaction was shortstopped in the same manner as the run in which butyllithium was used.

The low inherent viscosity polybutadiene and the cis-polybutadiene were blended by mixing solutions of the respective polymers after which the polymers were coagulated with isopropyl alcohol. The resulting polymer composition was then separated and dried in a vacuum oven. The resulting polymer composition contained 80 percent of the low inherent viscosity polybutadiene and 20 weight percent of the cis-polybutadiene. Certain properties of the polymer composition are shown below in Table IV.

TABLE IV

|  | A | B |
|---|---|---|
| 1.9 I.V. Polybutadiene, parts by weight | 100 | 80 |
| 15.2 I.V. cis-Polybutadiene, parts by weight | 0 | 20 |
| Cold flow, mg./min.[1] | 29.4 | 11.9 |
| Inherent viscosity [1] | 1.9 | 3.98 |
| Mooney (ML-4 at 212° F.)[1] | 10 | 16 |

[1] See footnotes to Recipes and Table I of Example I.

The data in the foregoing table show that the tendency of the low inherent viscosity polybutadiene to cold flow was reduced by incorporation of the high inherent viscosity cis-polybutadiene.

The polymer composition was compounded, and properties were determined on the uncured stock as well as on the vulcanizate. Control runs were also conducted in which a commercial polybutadiene prepared with an organolithium catalyst and a high cis-polybutadiene were compounded and similar properties determined. The compounding recipes employed are shown below.

RECIPES

| | Parts by weight | | |
|---|---|---|---|
| | B [3] | C [6] | D [7] |
| Polymer | 100 | 100 | 100 |
| High abrasion furnace black | 50 | 50 | 50 |
| Zinc oxide | 3 | 3 | 3 |
| Stearic acid | 1 | 1 | 1 |
| Flexamine [1] | 1 | 1 | 1 |
| Resin 731 D [2] | 5 | 5 | 5 |
| Philrich 5 [3] | 5 | 5 | 5 |
| Sulfur | 1.75 | 1.75 | 1.75 |
| NOBS Special [4] | 1.1 | 1.1 | 1.05 |

[1] Physical mixture containing 65 percent of a complex diarylamine-ketone reaction product and 35 percent of N,N'-diphenyl-p-phenylene-diamine.
[2] A disproportionated pale rosin stable to heat and light.
[3] Aromatic oil.
[4] N-oxydiethylene-2-benzothiazyl sulfenamide.
[5] 80/20 blend of 1.9 I.V. polybutadiene and 15.2 I.V. cis-polybutadiene.
[6] Commercial organolithium-catalyzed polybutadiene.
[7] Commercial cis-polybutadiene.

Certain properties of the raw rubbers as well as of the compounded stocks are set forth below in Table V.

TABLE V

| | B | C | D |
|---|---|---|---|
| Raw Rubber Properties | | | |
| Cold flow, glass plate method [1] | 3.70 | 7.66 | 3.60 |
| Raw mill rating [2] | 9 | 5 | 1 |
| Compounded Stocks | | | |
| Mooney (MS 1½ at 212° F.) [3] | 42 | 42.5 | 49 |
| Extrusion at 250° F.: [4] | | | |
|   Inches/min | 46.0 | 67.5 | 46.5 |
|   Grams/min | 109.0 | 110.0 | 107.0 |
|   Rating | 7+ | 11 | 6+ |
| Cured 30 Minutes at 307° F. | | | |
| $V_r$ [5] | 0.376 | 0.376 | 0.409 |
| 300% Modulus, p.s.i. [6] | 1,445 | 1,270 | 1,135 |
| Tensile, p.s.i. [6] | 2,420 | 2,400 | 2,300 |
| Elongation, percent [6] | 420 | 520 | 480 |
| 200° F. Max. Tensile, p.s.i. [6] | 1,170 | 1,250 | 1,120 |
| Heat Build-up, $\Delta T$, °F. [7] | 50.7 | 51.7 | 42.2 |
| Resilience, percent [8] | 74.1 | 72.6 | 75.4 |
| Shore A hardness [9] | 64 | 59.5 | 60.0 |
| Oven Aged 24 Hours at 212° F. | | | |
| 200% Modulus, p.s.i. [6] | 1,580 | 1,325 | 1,200 |
| Tensile, p.s.i. [6] | 2,070 | 1,485 | 1,595 |
| Elongation, percent [6] | 235 | 210 | 230 |
| Heat Build-up, $\Delta T$, °F. [7] | 41.5 | 43.6 | 36.1 |
| Resilience, percent [8] | 80.4 | 80.9 | 81.6 |
| Shore A hardness [9] | 68.0 | 69.5 | 68.0 |

[1] Method is based on the change in contact area of four right circular cylinders of rubber compressed between two glass plates. The cold flow rating is the ratio of the final contact area to the original contact area. Four pellets, approximately 0.450 inch in diameter and the same in height, are measured with a hand micrometer and recorded as thousandths of an inch. The average diameter is obtained and squared. Glass plates 3' x 4' weighing an average of 26–27 grams, which have been cleaned and polished with silicone lens tissue, are used for the test. Four rubber pellets are positioned at the corners of a 1.5' x 2' rectangle within the glass plate. Another glass plate is positioned over the top of the pellets such that it is directly over the bottom plate and a 160 gram 3' x 4' lead plate is placed on top. The assembly is allowed to stand 18 hours at 80° F. after which the lead weight is removed and the contact area observed through the glass plate. Measurement is first taken across the longest dimension of the contact area and a second measurement taken at right angles to the first one. The eight measurements (two for each pellet) are recorded and averaged to obtain a final average diameter. The value is squared and divided by the initial average diameter squared to obtain the cold flow.
[2] Based on a scale from 1 to 10 with 10 being the best rating.
[3] ASTM D297-55T.
[4] Extrusion is carried out at 250° F. by essentially the same procedure as described by Garvey et al., Ind. & Eng. Chem. 34, 1309 (1942). As regards the rating figure, 12 designates an extruded product considered to be perfectly formed whereas lower numerals indicate less perfect products.
[5] The $V_r$ determination was made by cutting samples of the cured polymer weighing approximately 1.5 grams from regular tensile slabs, weighing them on an analytical balance, and allowing them to swell in n-heptane for six days at 30° C. The swollen specimens were blotted with filter paper and transferred quickly to tared weighing bottles. The volume of imbibed solvent was obtained by dividing the difference between the weight of the swollen sample and the weight of the dry, extracted sample (dried 16 hours at 70° C. in vacuo) by the density of the solvent. Next the dry samples were weighed in methanol and their volume calculated. From this volume was subtracted the volume of fillers (calculated from the recipe and original sample weight) giving the volume of polymer. The latter was used to calculate the volume fraction of polymer in the swollen stock ($V_r$). This method is described in Rubber World, 135, No. 1, 67–73 (1956).
[6] ASTM D412-51T. Scott Tensile Machine L-6. Tests made at 80° F.
[7] ASTM D623-52T. Method A, Goodrich Flexometer, 143 lbs./sq. in load, 0.175 inch stroke. Test specimen is a right circular cylinder 0.7 inch in diameter and 1 inch high.
[8] ASTM D945-55 (modified). Yerzley oscillograph. Test specimen is a right circular cylinder 0.7 inch in diameter and 1 inch high.
[9] ASTM D676-55T. Shore Durometer, Type A.

It is noted that the composition of this invention had substantially the same cold flow value as the cis-polybutadiene. Furthermore, the mill handling as well as the mill rating and extrusion properties of the present composition were superior to the cis-polybutadiene. The fact that the cold flow of a 10 Mooney polybutadiene can be reduced to the same level as that of a 46.5 Mooney cis-polybutadiene by the incorporation of a minor amount of a high inherent viscosity cis-polybutadiene is highly significant.

As will be evident to those skilled in the art, many variations and modifications of the invention can be practiced in view of the foregoing disclosure. Such variations and modifications are clearly believed to come within the spirit and scope of the invention.

What is claimed is:

1. A composition consisting essentially of (1) a major amount of a homopolymer of butadiene having an inherent viscosity in the range of 0.75 to 3, from 35 to 48 percent of said polybutadiene being formed by cis-1,4-addition of 1,3-butadiene, and (2) a minor amount of a homopolymer of butadiene having an inherent viscosity in the range of 6 to 20, the amount of component (2) being in the range of 2 to 40 weight percent of the total amounts of components (1) and (2), the inherent viscosity being determined from the viscosity of a solution of 0.1 gram of polymer per 100 milliliters of toluene at 77° F.

2. The composition according to claim 1 wherein the amount of component (2) is in the range of 5 to 30 weight percent of the total amounts of components (1) and (2).

3. The composition of claim 1 wherein component (2) is a homopolymer of butadiene prepared by polymerizing 1,3-butadiene with an organolithium catalyst.

References Cited

UNITED STATES PATENTS

| 3,159,691 | 12/1964 | Kraus | 260—894 |
| 3,225,122 | 12/1965 | Stumpe | 260—894 |
| 3,244,773 | 4/1966 | Crouch | 260—894 |
| 3,278,644 | 10/1966 | Zelinski | 260—894 |

FOREIGN PATENTS

| 144,858 | 1/1952 | Australia. |
| 817,693 | 8/1959 | Great Britain. |

OTHER REFERENCES

Smith et al., Compound and Testing Diene Rubber, Rubber Age, vol. 87, No. 5, August 1960, pps. 815–822.

MURRAY TILLMAN, *Primary Examiner.*

G. F. LESMES, *Assistant Examiner.*